Feb. 20, 1945. J. M. KUHLIK 2,369,786
SOUND SILENCER FOR PROJECTORS
Filed July 4, 1942 3 Sheets-Sheet 1

INVENTOR.

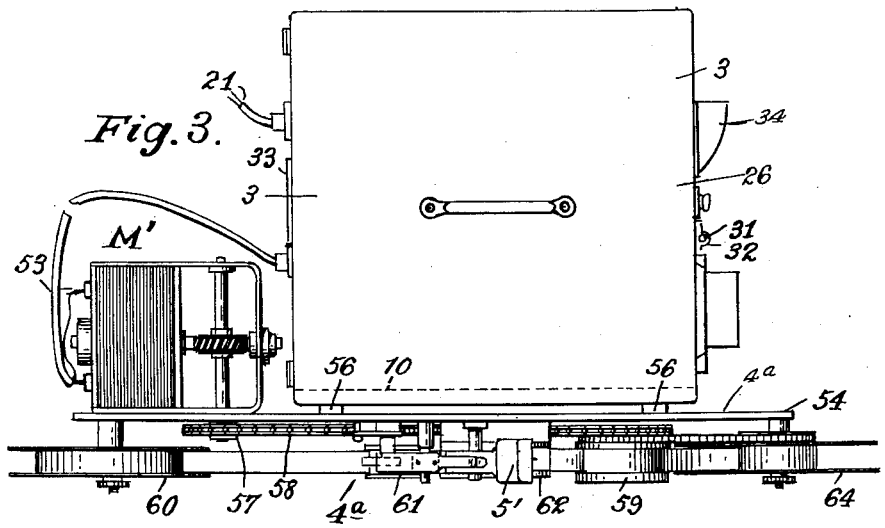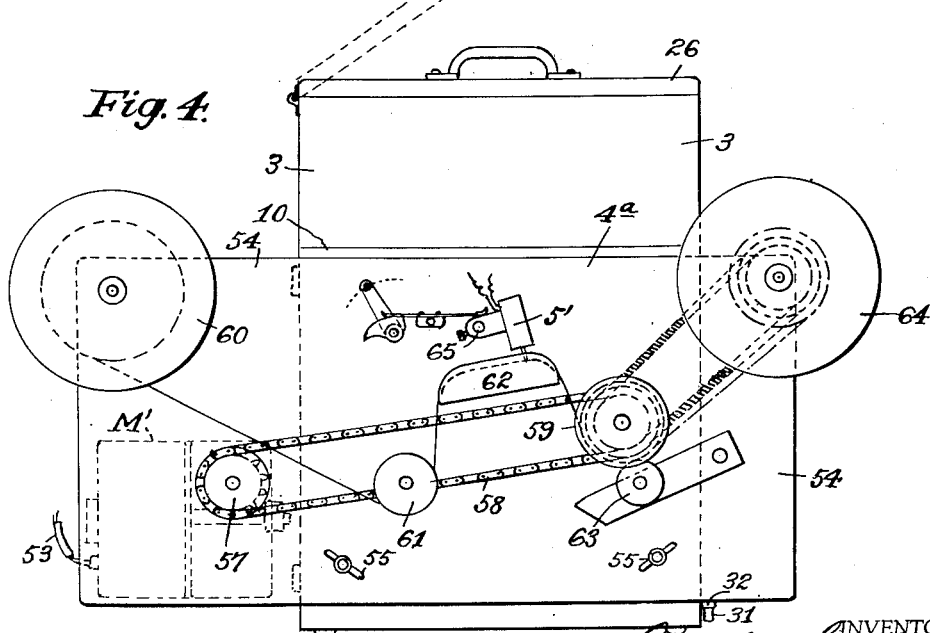

Feb. 20, 1945.  J. M. KUHLIK  2,369,786
SOUND SILENCER FOR PROJECTORS
Filed July 4, 1942  3 Sheets-Sheet 3
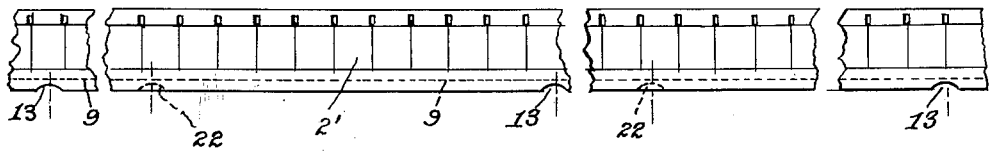
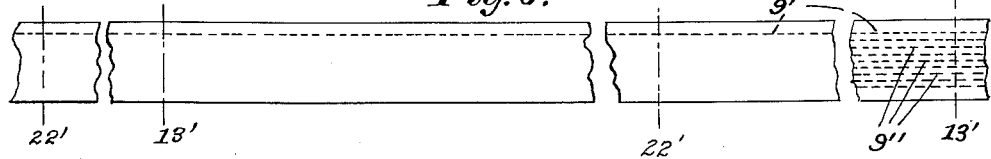
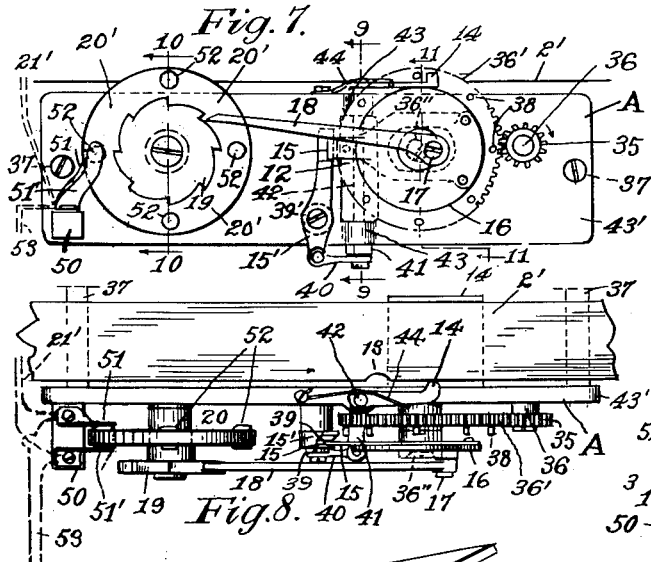
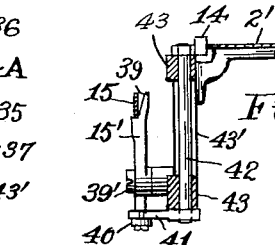
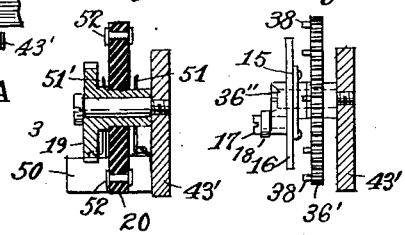
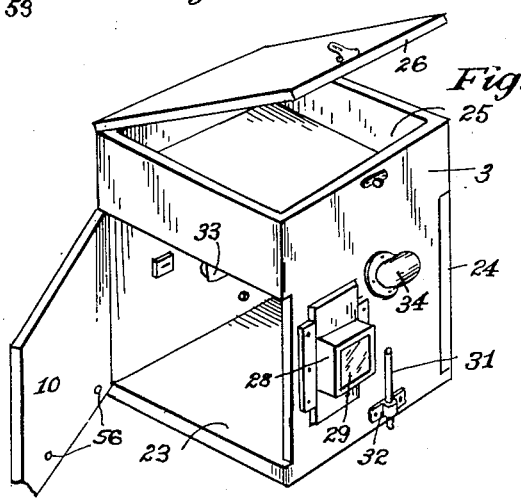
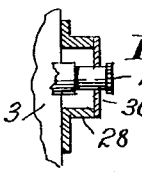
INVENTOR.
Jacob Miles Kuhlik Patented Feb. 20, 1945

2,369,786

UNITED STATES PATENT OFFICE 2,369,786

SOUND SILENCER FOR PROJECTORS

Jacob Miles Kuhlik, Brooklyn, N. Y., assignor to Hattie B. Kuhlik, Brooklyn, N. Y.

Application July 4, 1942, Serial No. 449,712

8 Claims. (Cl. 88—16.2)

This invention relates generally to a combined motion picture projecting and sound recording and reproducing apparatus of the portable type.

It has been found that when a sound recording and reproducing apparatus is used in conjunction with a motion picture projecting apparatus the noise from the motion picture projecting apparatus interferes with the satisfactory operation of the sound reproducing machine.

It has also been found in using this type of combined apparatus that the sound film tape is needlessly wasted.

It is an object of my invention to minimize the noise made by the motion picture projecting apparatus.

Another object is to save and economize on the film strip in such sound recording and reproducing apparatus.

Still another object is to provide means for synchronizing the motion picture film and the sound recording and reproducing film.

It is a further object to ventilate the housing containing the motion picture film apparatus.

Still another object is to provide a slidable and adjustable lens housing whereby projectors of different heights may be accommodated.

A still further object is to provide a housing for motion picture projecting apparatus with means for adjusting its angular position relative to its support.

Another object is to provide such a machine that is simple and compact in structure.

I accomplish the foregoing and other objects and advantages of my invention by encasing the motion picture projecting apparatus in a sound proof housing lined with sound-proof material and formed with a main compartment for the motion picture projecting apparatus, another compartment to house a disc phonograph to provide music while pictures are showing, and for special sound records prepared for the picture films, suitable doors for ready access to the casing, inlets and outlets respectively for cooling the mechanism, and discharge of the heated air from the lamp house, an adjustable sliding lens housing through which pictures may be taken and projected, and having means for the attachment of a sound recording and reproducing device to the outside of the casing for recording directly on the same film of the picture film, and for the attachment of a recording device for a separate film strip on which the recording is done, or the recording machine may be remotely situated and supported on its base.

I provide a control means between the picture apparatus, which runs the picture film, and the recording machine which runs a separate film on which the sound recording is done to synchronize the picture film and sound film, and at the same time by the said means provide for a considerable saving of film on which the recording is done, this being done by alternately stopping and starting the recording machine and thereby the sound film automatically. This is accomplished by a commentator, or the operator, as the different subjects of the picture strip are run. At the start of each subject of the picture film, a nick or notch is punched in one side of the picture film, which nick later is operative through the aforesaid means to start the sound recorder and thereby the film to run and record the matter by describing the scenes of this subject. At the end of such description, which is preferably arranged to be some time before the full scenes of this subject is concluded, another nick is then made in the film, which nick is operative to stop the recorder, and so continue to the end of the picture film, whereby the films are synchronized and saving of the film strip is effected while the recorder is stopped.

I also use the recorder to record directly on the picture film the subject matter that was recorded on the separate film of the recording apparatus by rerunning the film and reproducing the recorded matter and record the same with the recorder in line with the picture film directly on the picture film. This same process may be applied to duplicate films wherein many copies may be required, such as in educational films.

In the drawings:

Fig. 3 is a top plan view of the casing, with the picture machine inside, and shows a sound recording device attached to the door, for operating on a separate film strip, using the connections for providing synchronism between the two film strips.

Fig. 4 is a front side elevation of the showing of Fig. 3.

Fig. 5 is a view of a picture film showing nicks cut along one edge thereof, which are alternately operative to start and stop the recording device.

Fig. 6 is a view of a recording film, showing portions of recorded matter.

Fig. 7 is a front side view, enlarged, of the control means operated by the nicked picture film, for stopping and starting the recording device.

Fig. 8 is a plan view of the showing of Fig. 7.

Figures 1, 2:
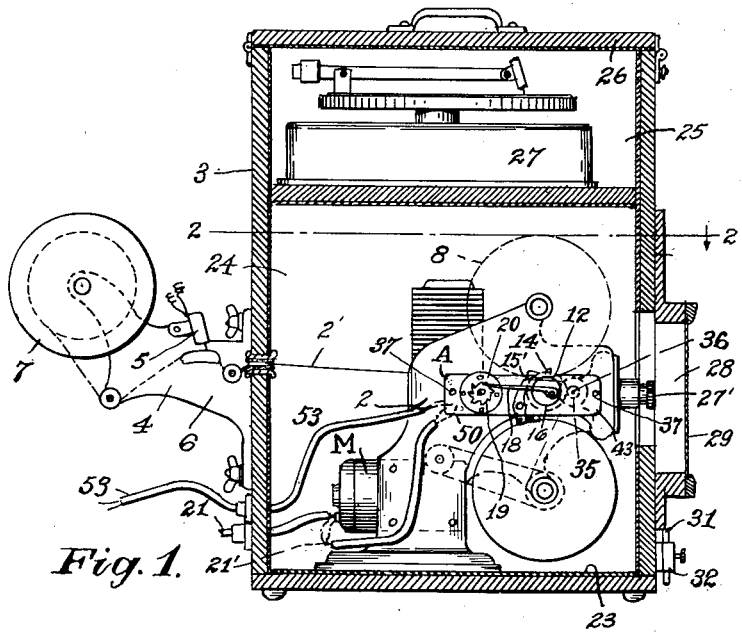
Fig. 1 is a vertical sectional view of the improved casing and showing in connection therewith a sound recording device, for impressing a sound track in the same picture film strip of the picture film, and operated by the picture machine.
Fig. 2 is a cross sectional view, taken on line 2—2, of Fig. 1, showing the picture machine in position in the casing.

Figs. 9, 10 and 11 are sectional detail views taken respectively on lines 9—9, 10—10 and 11—11 of Fig. 7.

Fig. 12 is a perspective view of the silencing casing.

Fig. 13 is a modification of the lens housing.

As shown, several set-ups of my device may be had, for the combined use of my silencing case, enclosing the picture camera or projector, and operatively connected to a sound recording mechanism, with the latter preferably located outside the casing, where the same may be easily manipulated by the operator in a quiet atmosphere. In Figs. 1 and 2, I show a projector 2, enclosed in the case 3 with a lining of any suitable sound deadening material, and arranged to be entirely operative therein, a silent picture film 2', in position, and a sound recording device 4, attached to the outside of the casing at the rear, to be in alinement with the film reels and the intermittent feeding mechanism of the picture apparatus. The recording device 4, in its most simple form is here arranged with the recording unit 5 (adapted for both recording and reproducing), carried on a bracket 6, attached to the rear end of the case 3. The bracket carries a reel 7, which takes the place of the top reel 8, shown in dotted lines, Fig. 1 or the same reel may be applied, when this particular set-up is used. With this set-up a sound track 9 is impressed in the same film of the silent picture showing with the track at one side of the film just outside the picture frames.

The recording device 4 requires no motor since the projector provides the power to advance the film, and a commentator may describe the scenes which at the same time are recorded, and may then be run over and reproduced by the unit, without the commentator each time the picture is run, in a manner well understood in this art.

In Figs. 3 and 4, a more comprehensive recording mechanism is used, and as shown at 4ᵃ, may be attached to the casing, preferably to the door 10, so when desiring to line up the film or to adjust the projector, the recorder is swung aside with the door. This, however, is not important, since the recorder may be quite remotely situated on its own supporting base. The recorder in either case, of the showing in Figs. 3 and 4, will be operated by its own power, as by a motor M'.

A control means is provided, in the nature of an attachment, indicated at A, in Figs. 1 and 2, preferably connected to the projector by which the operation of the recorder 4ᵃ, is under complete control, to start and stop the recorder, and by which the film band of the recorder is kept in perfect synchronism with the picture film. The picture film 2', as shown in Fig. 5, is nicked along one side thereof, preferably opposite the perforated side, when a single line of perforations is used, and the film strip at this side, between the edge of the film and picture frames provides a free space along which the sound track 9 is impressed, and nicks 13 are made along this edge of the film. The nicks 13 indicate the beginning of each subject of the film, and are punched in any desirable manner as by a hand punch, when the picture is run to so separate the different subjects of the picture. The operator or commentator may then, when preparing the matter to be recorded on the sound film, and who has beforehand viewed and examined the picture film to become familiar with the subject matter thereof, so he may arrange his comment of each subject on the various scenes by making notes as they are showing, rewind the film and repeat such scenes until his comment is in proper form, and as short as possible for the purpose of saving film used on the recording machine. This is accomplished by the use of the control means A, which has an attachment applied to the projector to rotate a one-revolution clutch 12, which is controlled in its operation by a nick 13, punched in the edge of the picture film. For example, assuming there are twenty different subjects throughout the full length of the picture film, at the beginning of each subject a nick 13 is punched, and these nicks are effective to operate a spring pressed finger 14, of the control means, that drops into the nicks and through suitable connections with the finger will release a clutch arm 15, carried by a disc 16, to which the clutch arm is fixed. The disc will make a complete rotation, and a crank pin 17, on the disc, and a pawl 18, on the pin 17, will rotate a ratchet wheel 19, affixed to an insulated rotatable switch plate 20, a one-tooth space to a position to make contact with a contact member of the switch plate, with an electric supply line 21, to close the switch, and thereby run the motor M' of the recorder. On the next tooth motion of the ratchet 19, a non-contact position is made on the switch plate 20, and the motor M' is stopped, this being caused by a nick 22, punched in the picture film as soon as the scenes of any subject matter of the film has been described. A nick 13, at the beginning of each subject of the film starts the motor M', of the recorder, as the rotating switch plate 20, is then on a live contact and the motor will continue to run until the next nick 22, of the picture film is reached which again rotates the clutch and the switch plate 20, to a non-contact position and the recorder is stopped. This nick appears at the conclusion of the descriptive matter of that particular subject or zone that is impressed on the sound film and before that particular subject has been fully shown which takes place when the picture film travels to the next succeeding nick 13. During this travel of the picture film from nick 22 to nick 13 the recording machine is stopped and the sound film stops traveling and this represents a saving in the sound film equal to the distance between such nick 22 and the next nick 13. It is estimated that this saving amounts to about 15 percent of each subject, and in a roll of film for example 100 feet long, divided into twenty subjects of equal length, this would represent a saving of about 15 to 20 feet. This will be better understood by reference to Fig. 6, which shows a recorded line 9', representing recorded matter of the first subject of the picture film, which subject ends at the nick 13, on the picture film, see Fig. 5, and on line 13' in Fig. 6, while the prior nick 22 thereof, by which the recorder was stopped, is shown in the recording film, Fig. 6 at 22'. In other words that part of the picture film between 22 and the next nick 13, that follows, is equal to the saving made each time the recorder 4ᵃ, is stopped by the nicks 22, of the picture film.

By this method of punching the film, each picture film varies as to the number of zones and subjects thereof between nicks 13 and 22, and these control the starting and stopping of the recorder. This method will also enable the impressing of a plurality of sound track 9", see Fig. 6, on the same recording film, to run with any one of a number of picture films therewith each having been divided into zones and subjects thereof by the nicks 13 and 22.

The casing 3, as best seen in Fig. 12, may be constructed in any desirable manner to serve the purpose intended, principally to house the picture apparatus therein, for operation thereof when the case is closed, to muffle the objectionable noises, to provide a quiet surrounding outside the same for other work being carried on at the time, such as music, conversation, lecturing, dictation or performances of any kind, as is often required in school rooms for educational purposes, home entertainment and the like.

The casing, since this sort of work is carried from place to place, serves as a carrying case as well. As shown, the picture machine is fixed to the forward part of a floor or base 23, of the case, supported between a front and rear side wall reaching above the projector, and here closed by a partition to provide a lower compartment for the projector and a shallow open box-like compartment by said rear and front side walls above the partition, and closed at the opposite sides by short side walls from the partition to the top. A door 10, at the front, and a similar door 24, at the rear, opens into the lower main compartment of the case, in which space forward thereof the picture machine is housed, and a considerable amount of space is left at the rear of the machine for storage of supplies, etc., when in transit. At the top of the case said shallow compartment indicated at 25, has a hinged cover 26 to swing on hinges to open upward therein from said rear side wall for reception therein of a phonograph 27, of the disc type to provide appropriate music with the picture when so desired, or special prepared records, that will synchronize with the picture film. The case further is provided with a lens housing 28, in the nature of a slide, the front having a glass window 29, through which the lens 27', may operate. By this form of slide, projectors of different heights may be accommodated. The lens 27', itself, may be fitted in the front wall of the slidable housing, which may be of wood as at 30, to prevent projection through the glass, as shown in Fig. 13. When projecting the picture to direct the scene on the screen, the case may be tilted upward and regulated to any angle by an adjustable rod 31, slidable in a bracket 32, and clamped to retain the angular setting, as will be understood.

The case is further provided with an inlet 33, for cool air to enter the case, and an outlet 34, through which the heated air from the motor and lamp house of the projector is discharged, which may be effected by a fan, generally a part of the projector (not shown).

The attachment, designated by A, and shown on an enlarged scale in Figs. 7 to 11, inclusive, is so constructed to be readily applied to the projector. As here shown, a pinion 35 is attached to the end of the sprocket shaft 36, of the projector, to rotate therewith. The attachment as a complete unit and the parts thereof mounted on a plate frame has a spur gear 36', which meshes with the pinion for continuous rotation, the pinion passing through a bore in the frame plate to remain on the sprocket shaft. The attachment is connected to the side of the projector for removal when desired supported on studs 37, properly positioned for the pinion and gear to mesh, the gear 36', being one member of a clutch and freely rotates on a stud 36", and the gear has a series of pins 38, near its periphery in circular spaced relation at one side thereof which pins will engage a spring clutch arm 15, before referred to, carried by the disc 16, that is loosely mounted on the same stud 36", on which the gear is mounted. The spring clutch arm 15, which normally through its spring tension engages the pins is withdrawn where engaged by a rocking stop arm 15', which has a cam-faced part 39, effective to draw the spring clutch arm free of the gear 36' and the pins 38, at the end of each rotation thereof, when the stop arm is returned to its normal position. The arm 15', is pivoted on a stud 39', and connected at its lower end with a link 40, connected with an arm 41, of a vertical rock shaft 42, rotatable in bearings 43, of the frame 43', on which all parts of the attachment are carried. The shaft 42, has the finger 14, fixed to the top thereof, which by a spring 44, is urged against the side of the picture film, there to engage the notches 13 and 22, cut in the film edge. Each time a notch passes the finger, the finger will drop in the notch, thereby rock the shaft 42, by the spring 44 and the arm 41 at the bottom of the shaft will rock the stop arm 15' free of the spring clutch arm 15, the end of which will spring against the pins 38 of the rotating gear 36' to rotate the disc 16 one full rotation, to be again engaged by the stop arm 15', and the cam-faced end 39 thereof will draw the spring arm from the pins to its idle position. To prevent the film from shifting rearward, while the finger 14 is urged against it, is a shelf 14' on which the film rides against a shoulder of the shelf, see Fig. 9.

The insulated disc 20 is attached to rotate with the ratchet and on the disc 20, which may be termed a rotating switch plate, there are contact members 52, between which are blank spaces 20', for make and break positions of the switch plate 20, by which the electric current is effected through a shunt line 21', that runs the motor of the recording device, to stop and start the same in accordance with the nicked portions 13 and 22, of the picture film. While the electric connections of the supply line may be arranged in any desirable manner to continuously run the projector motor M, and stop and start the recorder motor M', by the control means A, I have as here shown provided the usual line connector 21, directly connected to the motor M, of the projector, see Fig. 2, which may be started and stopped by the usual switch (not shown), a shunt line connection 21' from the poles of the motor M, leading to an insulated block 50, having a pair of contact fingers 51 and 51', both of which engage the same contact members 52, of the rotatable switch plate 20, one at each side of the disc, which extends through the disc to close the circuit through the shunt line 21', when the fingers engage the contact and break the same, when the disc 20 is rotated and the contacts 52 are moved out of engagement to alternately close and break the circuit of the line 21', and by a connecting line 53, leading from the contact fingers 51 and 51', to the motor M', of the recorder. By this arrangement, when switching off the current from the projector motor, the recorder is also stopped.

The recorder 4ª, is shown in Figs. 3 and 4, and as before stated, may be attached to the door 10, of the casing, or may be on its own base, quite remotely situated from the casing, the operations and control thereof by the aforesaid means being the same. As shown, the reels and mechanism of the recorder are supported on a plate 54, attached to the door 10, of the case 3, by thumb screws 55, to threaded sockets 56, of the door 10. The motor M', controlled by the control means A, is here arranged to drive a sprocket 57, and by a chain 58, or other connection, drive a film feed wheel 59, over which the film is laced and drawn from the supply reel 60, over a roller 61, and over a film support 62, where the unit 5', acts on the film and the film advanced by a pressure roller 63, to be received by the take-up reel 64. The unit 5' is adapted for transverse movement on the stud 65, for track positions across the film, to cut line tracks on the same recording film for different picture films.

Having described my invention, I claim:

1. A combined motion picture projecting and sound recording and reproducing machine of the portable type comprising a sound-proof housing having side walls, a window formed in one of the side walls for projecting pictures therethrough, apparatus for projecting motion pictures encased in said housing including a traveling strip of film and means for propelling said strip through and exteriorly of the housing, apparatus on the exterior of the housing for recording and reproducing sound on said strip of film and mechanism actuated by said traveling film for controlling the operation of said sound recording and reproducing apparatus.

2. A combined motion picture projecting and sound recording and reproducing machine of the portable type comprising a sound-proof housing having side walls, a window formed in one of the side walls to permit pictures to be projected therethrough, apparatus for projecting motion pictures encased in said housing including a traveling strip of film formed with spaced notches along one edge thereof and a motor for propelling said strip through and exteriorly of the housing, apparatus on the exterior of the housing for recording and reproducing sound on said strip of film and mechanism actuated by said traveling film for controlling the operation of said sound recording and reproducing apparatus including a switch device having a member moved by the notches in said film whereby the circuit including said sound apparatus is opened and closed.

3. A combined motion picture projecting and sound recording and reproducing machine of the portable type comprising a sound proof housing having side walls, a window formed in one of the side walls, apparatus for projecting pictures encased in said housing including a traveling strip of film, a motor for propelling said strip, apparatus on the exterior of the housing for recording and reproducing sound including a separate strip of film, a motor for propelling said latter film and mechanism actuated by the picture projecting film for controlling the operation of said sound recording and reproducing apparatus.

4. A combined motion picture projecting and sound recording and reproducing machine of the portable type comprising a sound proof housing having side walls, a window formed in one of the side walls, apparatus for projecting pictures encased in said housing including a traveling strip of film formed with notches along one edge thereof, a motor for propelling said strip, apparatus on the exterior of the housing for recording and reproducing sound including a separate strip of film, a motor for propelling said latter film and a switch device having a movable member actuated by engagement with said notches for opening and closing the circuit through the sound film propelling motor.

5. A combined motion picture projecting and sound recording and reproducing machine comprising apparatus for projecting pictures including a motor propelled traveling strip of film with spaced notches in one edge thereof, apparatus for recording and reproducing sound including a motor, a sound unit, a stylus, a traveling film propelled by said motor and switching mechanism for controlling the circuit through said latter motor including stationary contacts, a rockable arm in normal engagement with the notched edge of said picture film and adapted to be rocked by the notches in said film and a rotatable disc operatively connected to said arm, spaced contacts carried by said disc and adapted to be moved into and out of engagement with said stationary contacts upon rotation of the disc.

6. In combination, a casing, a moving picture projector in a lower compartment thereof, supported forward on a base forming the bottom of the case, joined to front and rear upright side walls reaching above the projector, a partition to close said lower compartment at the top, to provide above by said upright walls and short opposite side walls from the partition to the top, an open upper compartment at the top of the case in which a disc phonograph is housed, a closure cover for the top compartment hinged to swing upwardly from said rear wall, to be open when said phonograph is in operation and the lower compartment having doors swinging outwardly from each side of said rear wall and hinged thereto, to close the lower compartment when the projector is in operation, an opening in said lower compartment in the front wall forward thereof where the projector is located in the line of the lens, said opening being closed by a slideable lens housing adjustable between guide members for upward and downward adjustment and clamped for projectors of different heights, means connected with the housing at the front thereof through which projections from the lens are projected to prevent emission of noise from the mechanism within said compartment, a screened inlet and outlet for said compartment to permit exhaust of heated air and entrance of cool air, a slit in the rear wall of the compartment in line with the reels of the projector through which a film from a sound recording device clamped outside the casing at the rear is operative to record and produce on the same film of the picture film of the projector, and means for attachment of a second sound recording and reproducing machine on the front door of the casing for recording and reproducing on a separate film, adapting the door to swing open with the sound recorder thereon, for access to the projector, and means connected with the casing adapted to tilt the front end thereof upward when projecting to regulate the same to a screen, including a bracket fixed to the lower forward front of the case through which a rod is adjustable and clamped to extend downward to hold the case tilted to different angular positions.

7. In combination, a casing, a moving picture projector operatively enclosed therein, a sound recording device carried on a bracket outside the casing in the line of the projector where through a slot in the casing a film from a reel on the bracket leads the film to the projector, a picture film, the scenes on which have been separated into zones and indicated by punched nicks along the side of the film, at the beginning and at the end of each zone, talking matter or sound to be applied, prepared and ready to be recorded, a second recording and reproducing machine carried by and outside the door enclosing the projector, a motor which drives the projector, and a motor to drive said second recorder, a pinion fixed to the sprocket shaft of the projector, means carried on a frame as a complete unit, in the form of an attachment connected to the side of the projector, including a spur gear meshing with said pinion for continuous rotation by said pinion, said gear forming one member of a one-revolution clutch loosely mounted on a stud of the frame and having pins extending from one side thereof and means cooperative with said notches of the picture film, including a vertical shaft in bearings of the frame, at the top of which an arm is fixed reaching outward to one side with a rounded end thereof to engage said notches along the edge of the film, said arm urged into the notches by a spring fixed to the frame engaging the arm and thereby rock the shaft, an arm at the lower end of the shaft linked to a short arm of an upright rock lever pivoted on the frame and by a longer arm thereof extending upward with a cam-faced end and stop shoulder thereof, adapted to engage a spring finger fixed to a disc, likewise freely mounted on said stud, which supports said gear, to normally engage the pins thereof but held by said cam-faced end of said rock lever to the stop thereof in an inactive position from said pins until said rock lever is tripped by the arm and the rounded end thereof entering a nick in the film, means connected with the disc to alternately stop and start the said second recorder, including a crank pin on the disc, a pawl on the crank pin adapted to engage a ratchet wheel loosely mounted on a stud on the frame, an insulated disc fixed to rotate with the ratchet having contact and non-contact members spaced around said disc corresponding to the teeth of said ratchet, alternately moved to position for each rotation of said clutch between a pair of switch poles mounted on an insulated block of the frame, from which through a shunt line and a direct line the current is supplied from the connecting poles of a line to the motor of the projector.

8. A casing, a moving picture projector operatively enclosed therein, a sound recording device carried on the outside of the casing arranged for use with the same film of the projector, comprising a bracket removably attached to the rear of the casing, a stud on the bracket to support the supply reel removable from the projector to said stud, a guide roller under the supply reel to lead the film to a guide base of the bracket, where a pivoted sound unit above the base engages the film along one side thereof and where a hand punch to punch nicks along the film may be conveniently used, a guide roller under and forward of the base to guide the film downward and tightly over the forward rounded end of the base and upward through a slotted opening in the casing to lead the picture film for continuous forward movement thereof, propelled forward by the projector before reaching the intermittent mechanism thereof.

JACOB MILES KUHLIK.